May 27, 1969     W. C. KAHN     3,446,909
FLUID-TIGHT ELECTRICAL ENCLOSURE
Filed May 29, 1967     Sheet 1 of 3
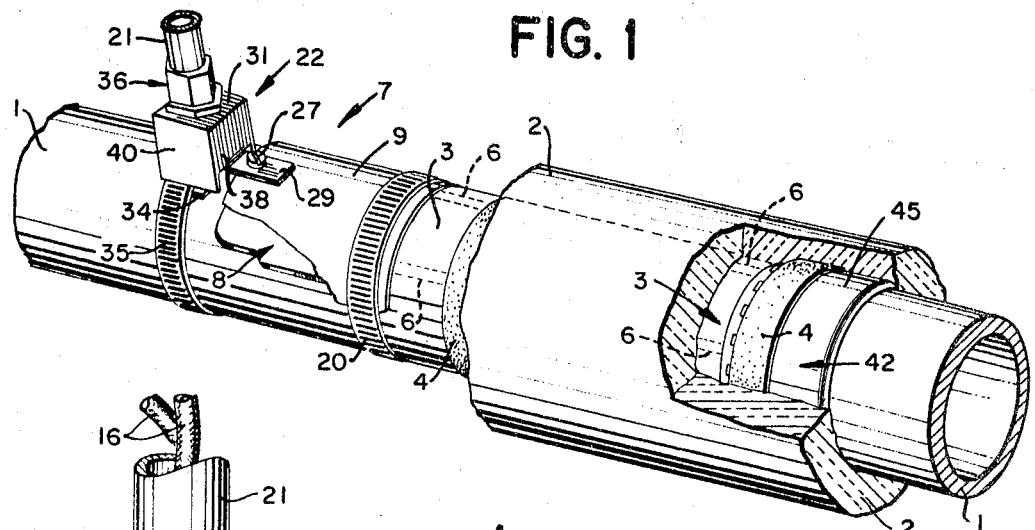
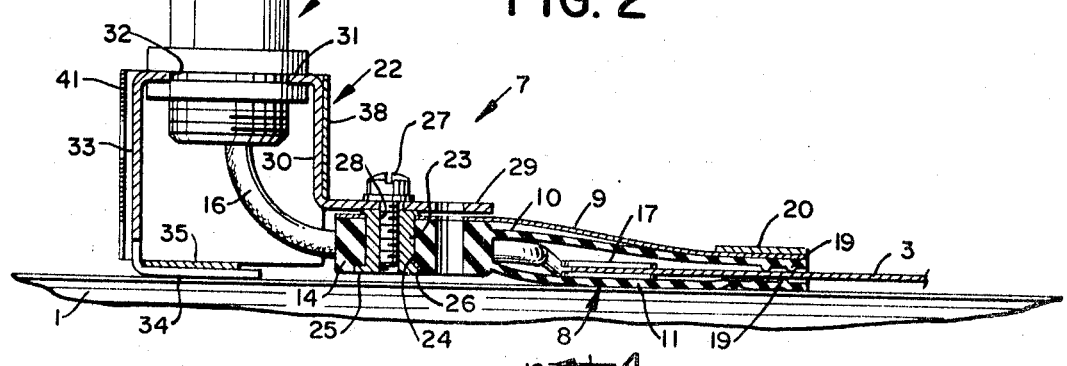
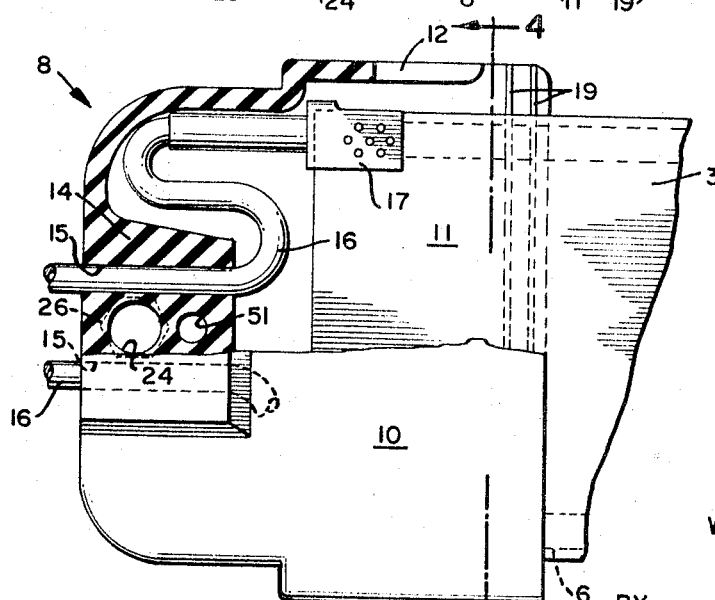
INVENTOR
WALTER C. KAHN
BY
Pennie, Edmonds, Morton, Taylor & Adams
ATTORNEYS

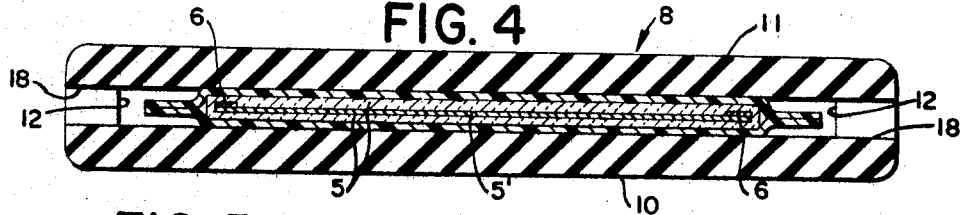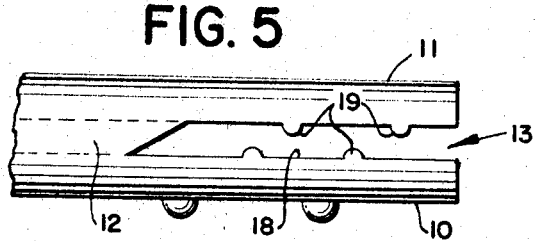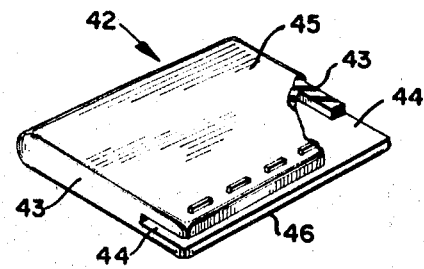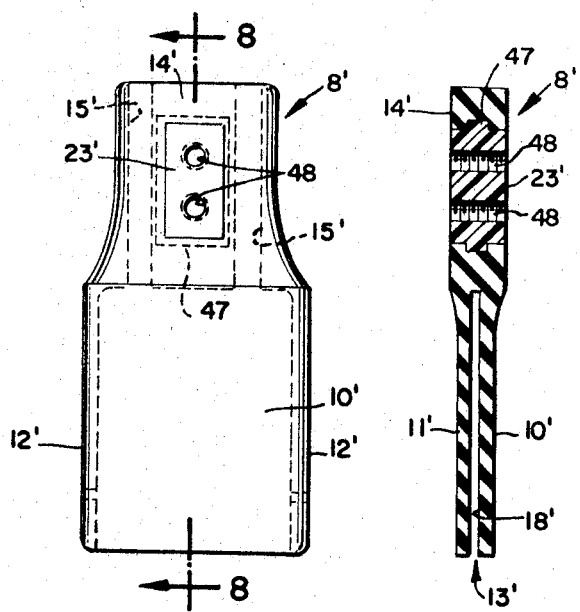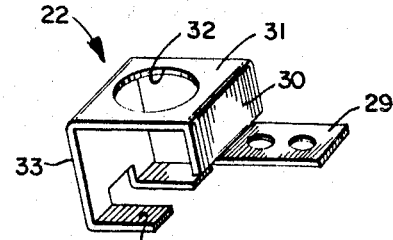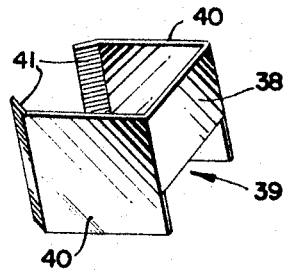

United States Patent Office 3,446,909
Patented May 27, 1969

3,446,909
FLUID-TIGHT ELECTRICAL ENCLOSURE
Walter C. Kahn, Westport, Conn., assignor to Electro-Trace Corporation, Danbury, Conn., a corporation of New York
Filed May 29, 1967, Ser. No. 642,069
Int. Cl. H02g 3/00, 15/08
U.S. Cl. 174—71                           14 Claims

ABSTRACT OF THE DISCLOSURE

A fluid-tight enclosure for receiving and enclosing therein the end portion of a strip-shaped conductor, the enclosure comprising a bag with a slit, open end into which the conductor extends, and a clamp tightly closing the open end of the bag in curved configuration. The enclosure when used for making an electrical connection further includes a support portion, openings in the support portion leading to the interior of the bag for receiving a second conductor, and a bracket connected to the support portion for holding a tubular housing for the second conductor.

BACKGROUND OF THE INVENTION

Field of the invention

The present invention pertains to enclosures for electrical conductors and more particularly to a fluid-tight end enclosure for a strip-shaped conductor for enclosing the end portion of the conductor and connecting it to another conductor internally of the enclosure.

Description of the prior art

In certain situations, there is a need for insulating and heating pipes through which fluid is adapted to flow. Also, other structures such as tanks require that the material or fluid contained therein be kept within a certain temperature range regardless of changes in the ambient temperature. One solution to this problem has been to cover the pipe or other structure with an insulated electric resistance element which is connected to a source of voltage to create the required heat. In order to provide a satisfactory, workable construction, it is desirable to provide a connector assembly for connecting the eletcrodes or terminals of the electric resistance element to the conductor leading to the source of voltage or other electrical apparatus after the resistance element has been wrapped about the structure to be heated. Such a connector assembly is advantageously constructed to seal the terminal connection of the resistance element with the conductor leading to the source of voltage against the ambient atmosphere to prevent corrosion thereof and to prevent electrical shorting of the system.

In my prior U.S. Patent No. 3,257,498 entitled Fluid-Tight Cable Connecting Means, granted on June 21, 1966, I disclose such a fluid-tight connector assembly for enclosing and connecting the end portion of a conductor, such as a strip-shaped insulated resistance element, to a source of voltage or other electric apparatus. The connector assembly disclosed in the above-mentioned patent includes a flexible, open-ended bag into which the end portion of the strip-shaped conductor is inserted, holding means for a second conductor located at a point spaced from the open end of the bag and through which the end portion of a second conductor is inserted, means for connecting the end portions of the conductors together internally of the bag, and means for tightly sealing the bag with the end portions of the conductors enclosed therein. In the preferred embodiment of the invention disclosed in my earlier patent, the holding means for the second conductor is secured about an opening in one wall of the bag and provided with a passage connected to the bag interior. The second conductor passes through this passage of the holding means; and a fluid-tight connection is made by means of a compressible sealing member disposed within the passage. In addition, a metal, flexible shield member is superimposed over this wall of the bag and attached thereto by the holding means. This shield extends to the open end of the bag; and upon clamping of the shield to the underlying support for the bag, the bag's open end is held tightly closed.

SUMMARY OF THE INVENTION

In accordance with the teachings of the present invention, a conductor assembly of simplified construction is provided for enclosing and connecting the end of a strip-shaped conductor means to a source of voltage. In construction, the assembly, like that disclosed in my earlier patent, includes a flexible bag having an open end for the insertion of the strip-shaped conductor. For receiving the second conductor, which is to be connected to the first conductor internally of the bag, the walls of the bag are formed together to provide a thickened area and this thickened area is provided with openings through which the second conductor is inserted. Sealing of the second conductor to the bag is effected by a fluid-tight connection at the openings in the thickened wall area; and the open end of the bag is held closed by a clamp upon attachment of the assembly to an underlying support.

In the assembly of the present invention, the thickened wall portion of the bag which holds the second conductor is provided with a rigid support member extending therethrough at a location spaced from the openings for the second conductor so as not to interfere therewith and at a location isolated from the interior of the bag. Attached to this support member is a separate mounting bracket. This bracket is provided for holding a tubular housing through which the second conductor may be led to the source of voltage for the strip-shaped conductor. The bracket is constructed so that it may be easily attached to the bag after the conductors have been connected together and the bag secured to the underlying support.

In addition to the above, the bag of the connector assembly constructed in accordance with the teachings of the present invention is provided with means for effecting a tight-unbuckled sealing of the open end of the bag in an arcuate configuration. For this purpose, the bag is provided with slits extending along its edge portions from its open end so that the two walls of the bag at the open end may flex independently of each other. This construction is of particular advantage where the connector assembly is to be secured to a pipe or other structure having a curved support surface requiring that the bag of the assembly be flexed into into a similar configuration to effect a neat conforming attachment thereto. In addition, this slit construction of he bag is advantageously employed with bag enclosures for sealing the end of the strip-shaped conductor attached to a curved support surface reardless of whether or not the enclosure is provided with means for making a connection to another conductor. Such a bag enclosure is suitable for sealing the dead end of the strip-shaped conductor against moisture and for otherwise protecting the ends of the conductive portions of the connector.

BRIEF DESCRIPTION OF THE DRAWINGS

FIG. 1 is a perspective view, partially broken away, of the connector enclosure and end enclosure assemblies secured to an insulated pipe;

FIG. 2 is a cross-sectional view of the connector assembly shown in FIG. 1;

FIG. 3 is a plan view of the bag member of the connector assembly partially broken away;

FIG. 4 is a cross-sectional view taken along line 4—4 of FIG. 3;

FIG. 5 is an enlarged side view of the open end of the bag shown in FIG. 3;

FIG. 6 is an enlarged perspective view, partially broken away, of the end enclosure shown in FIG. 1;

FIG. 7 is a plan view of a modified bag construction for the assembly shown in FIG. 1;

FIG. 8 is a cross-sectional view taken along line 8—8 of FIG. 7;

FIG. 9 is a perspective view of the bracket shown in FIG. 1 with the shield removed;

FIG. 10 is a perspective view of the shield for the bracket shown in FIG. 9;

DESCRIPTION OF THE PREFERRED EMBODIMENTS

Figure 11:
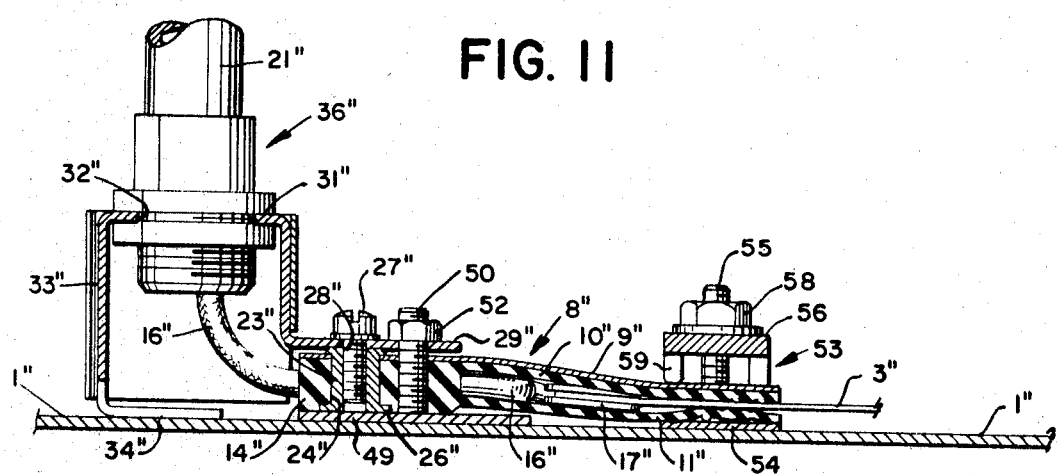
FIG. 11 is a cross-sectional view of the connector assembly constructed for attachment to an insulated tank.

As shown in FIG. 1 of the drawings, a pipe 1 through which fluid is adapted to flow is covered with an insulating material 2. Disposed between the pipe and the insulating material is a conductor in the form of a strip-shaped heating element 3. This heating element extends along the length of the pipe and is attached to its outer surface at spaced points by adhesive straps 4. The heating element may be of the construction disclosed in my earlier Patent No. 3,257,498. As there disclosed and as shown in FIG. 4 of the present application, it includes two glass-asbestos layers 5 having embedded therein a resistence layer 5' of graphite dispersed in silica and two elongated electrodes 6 extending adjacent the edges thereof, the electrodes being connected to opposite sides of the electrical resistance layer 5' so that a voltage applied to the electrodes will cause a current to flow across the length of the strip-shaped element. In order to connect the heating element to a source of voltage, a connector assembly generally indicated at 7 is provided. This assembly generally includes an open-ended flexible bag member 8 and an overlying flexible metal shield member 9.

As shown in FIGS. 3–5, the bag, which may be made of flexible material such as rubber, includes two opposite walls 10, 11 which are joined together at their edge portions 12 which have a thickness greater than the combined thickness of the two walls intermediate the edge portions to define a space between the walls for the insertion of the end portion of the heating element 3 through the open end 13 of the bag. At the rear of the bag, the two walls are joined together to define a thickened portion or area 14 filling the space between the walls. Through this thickened area, two openings 15 extend. These openings connect to the interior of the bag inwardly of its rear edge portion and are adapted to receive conductors 16, in the form of insulated wires, leading to the source of voltage. The end portions of these wires are disposed internally of the bag and the size of the openings is such as to hold them in fluid-tight relationship therein. To the ends of these conductors are attached electrical connectors 17 for connecting the conductors 16 to the electrodes 6 of the strip-shaped conductor 3.

For effecting a fluid-tight closure of the open end of the bag, the edge portions thereof disposed on opposite sides of the open end are provided with slits 18 extending inwardly from the open end. As indicated by the dotted lines of FIG. 5, these slits have a thickness equal to the difference in thickness between the walls of the bag and the edge portions; and the inner surface of the walls at the open end are provided with sealing ribs 19.

The slits in the open end of the bag permit the walls at the open end to flex independently of each other. Thus, when the bag is secured to the underlying pipe and conformed to its outer surface, the wall portions at the open end of the bag will lie completely flat on each other and no buckling will occur. This is a particular advantage where the underlying pipe is of small diameter and the radius of curvature of its outer surface thus small. In conforming the bag about such a pipe, the innermost wall lying immediately adjacent the outer supporting surface of the pipe will be curved about the radius of curvature of this outer surface while the outermost wall will be permitted to curve independently about the radius of curvature of the underlying curved wall of the bag, which due to the thickness of this wall, is larger.

After the connection of the strip-shaped conductor 3 with the conductors 16 has been made, a suitable silicone rubber sealant is applied to the inner surface of the bag walls at the open end thereof and an additional quantity of sealant is inserted into the interior of the bag to completely envelop the terminal connector 17 and assure the sealing of the openings 15 through which the conductors 16 extend. With the sealant applied, the bag is clamped to the underlying pipe by means of a pipe strap 20 which is positioned over the shield in alignment with the open end of the bag and then tightened about the pipe.

For leading the conductors 16 in a protected fashion to the source of voltage, these conductors are passed through a tubular housing 21 which is connected to the assembly by the bracket 22 shown in FIGS. 1 and 9. For purposes of mounting the bracket onto the assembly, a rigid support member 23 in provided. This support member extends perpendicular through the thickened portion 14 of the bag at a location spaced from the openings 15 therethrough and a location isolated from the interior of the bag. As shown in FIG. 3, a suitable hole 24 in the thickened portion of the bag is provided for receiving the support member. One end of the support member is fixed to the overying shield 9 while the other end is provided with an enlarged head 25 facing the outer surface of the underlying wall of the bag and disposed within an appropriately shaped recess 26 therein. Attachment of the shield member with this support member to the bag is effected by forcing the enlarged head of the support member through the hole 24, the resiliency of the bag material permitting this insertion.

The bracket 22 for supporting the tubular housing is connected to the support member 23 by means of a fastening member such as the screw member 27 threadably received within a threaded bore 28 in the support member. As shown in FIGS. 2 and 9, the bracket includes a first prong portion 29, a front wall portion 30 facing the bag, a top wall portion 31 spaced from the bag and having an opening 32 therethrough for receiving one end of the tubular housing, a rear wall portion 33, and finally, a bottom wall portion 34 spaced below the first portion 29 by a distance equal to the height of the support member 23 to provide the bracket with a lower open front. As shown in FIG. 2, the bottom portion 34 of the bracket will, due to its spacing from the portion 29, seat itself on the outer surface of the pipe when attached to the support member 23. A suitable pipe clamp 35 is wrapped around the bottom portion of the bracket and the pipe and is tightened to securely hold the bracket in place. The tubular housing 21 is connected into the opening 32 in the top wall 31 of the bracket by means of a nut assembly 36; and the conductors 16 extending out the rear of the bag are led through the bracket and into the tubular housing.

As shown in FIG. 9, the bracket defines an open-sided construction and for the purpose of protectively enclosing the conductors therein, a shield member is provided. This shield member as shown in FIG. 10 is constructed in a U-shape configuration with a front wall 38 cut away at its lower end to provide an opening 39 and with the side walls 40 turned inwardly at 41 at the rear of the shield. With this construction, the side walls of the shield may be flexed apart and then slid over the bracket with the side walls 40 aligned with the open sides of the bracket and with the lower edge of the front wall 38 seating on the portion 29 of the bracket. The opening 39 in the front wall of the shield permits the shield to completely enclose the sides of the bracket, with the opening 39 aligned with the open lower front of the bracket to permit the insertion of the conductors through the shield and bracket.

After the connector assembly with the bracket has been secured to the pipe, the outer insulation material 2 for the pipe may be positioned over this assembly to completey enclose it with only the tubular housing 21 extending outwardly therefrom.

As shown in FIG. 1, the end of the strip-shaped conductor to which no electrical connection is made is sealed within an end enclosure member 42 to protect the electrodes at this end conductor. An enlarged view of the end enclosure is shown in FIG. 6; and in construction, is similar to that of the bag 8 of the connector assembly 7 with the exception that no provision is made for receiving conductors in addition to the strip-shaped one. As with the bag of the connector assembly, the edge portions 43 of the end enclosure are slit at 44 to permit independent flexing of the opposite walls 45, 46. After insertion of the dead end of the strip-shaped conductor 3 into the open end of the end enclosure 42, silicone rubber sealant is applied to the inner wall surfaces and the enclosure is secured to the pipe by a suitable tape 4 disposed over the open end thereof and wrapped about the pipe.

In FIGS. 7 and 8, there is shown a modified embodiment of a bag member 8' for the connector assembly 7. This construction is particularly suited for smaller sized pipes where an overlying metal shield is not used. In construction, this modified bag structure is substantially the same as the bag structure shown in FIGS. 3–5 and like reference numerals with the suffix prime (') are used to designate like parts. The bag 8' differs from the construction shown in FIGS. 3–5 in that the rigid support member 23' is not connected to any shield member and instead is formed as an insert held in the thickened portion 14' of the bag by a flange 47 on the insert. Also, the support member is provided with two threaded holes 48; and when the bracket is secured thereto, two screws are advantageously used.

Figure 12:
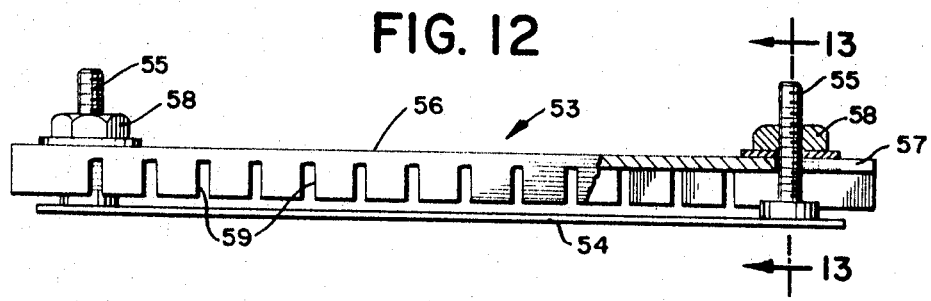
FIG. 12 is a partial cross-sectional view of the clamp for the open end of the bag of the assembly shown in FIG. 11.
Figure 13:
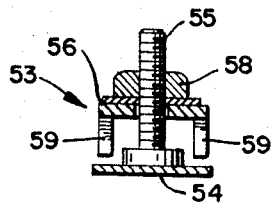
FIG. 13 is a cross-sectional view taken along line 13—13 of FIG. 12.

The above description of the connector assemblies has been made in connection with their attachment to a pipe. Where, however, it is desired to apply resistance elements about a large structure such as a tank where it is not feasible to use encircling straps, other provisions must be made for securing the assembly to the tank and for effecting a sealing of the open end of the bag. FIGS. 11, 12 and 13 show a modified connector assembly particularly constructed for attachment to large tanks. This assembly differs from that shown in FIG. 1 only in the means used for attaching it to the tank and for holding its open end closed; and accordingly, like reference numerals followed by the suffix double prime (") are used to designate like parts. As shown in FIG. 11, a support plate 49 having a threaded stud 50 projecting therefrom is cemented to the wall of the tank 1" and the connector assembly is positioned over the support plate with the stud 50 projecting through a hole 51" in the thickened portion 14" of the bag. After this assembly, the bracket 22" is then positioned over the stud member 50 and secured in place by means of a suitable nut 52 threaded over the stud. In addition, a screw 27" is used to connect the bracket to the support member 23" of the assembly in the same manner as with the construction shown in FIG. 1.

In place of an encircling strap for holding the open end of the bag 8" in sealed condition, a bar type clamp assembly 53 is provided. This clamp assembly is comprised of a lower flat bar member 54 to which are secured two threaded studs 55 at the opposite ends thereof. The other part of the clamp assembly includes an upper U-shaped bar member 56 having slotted ends 57 for receiving the studs 55. With reference to FIG. 11, the open end of the bag of the connector assembly 7" is inserted between the bar members 54 and 56, centrally of the studs 55 and then cooperating nuts 58 are threaded onto the studs to tighten the clamp together with the open end of the bag held in sealed condition therebetween. As shown in FIG. 12, the upper bar member is provided with spaced slots 59 which permit the clamp to be bent to conform to the curved surface of the tank, if necessary.

The above description of the present invention has been made with reference to presently preferred constructions; however, it is to be understood that various changes can be made thereto without departing from the scope of the invention as set forth in the following claims.

What is claimed is:

1. A fluid-tight end enclosure for receiving and enclosing therein the end portion of a strip-shaped conductor means comprising:
   (a) a flexible bag having:
      (1) two opposite walls joined together about their edge portions to form an open end between two opposite edge portions thereof for receiving the end portion of said strip-shaped conductor means, said opposite edge portions each having a predetermined length; and
      (2) a slit extending along each of said opposite edge portions from said open end, said slits having a length less than said predetermined length; and
   (b) means for tightly closing the open end of said bag in an arcuate orientation about an axis extending perpendicular to said open end and parallel to said walls with the end portion of said strip-shaped conductor means disposed internally thereof.

2. A fluid-tight end enclosure according to claim 1 wherein:
   (a) said edge portions joining the opposite walls together have a thickness greater than the thickness of said walls to define a space therebetween; and
   (b) said slits have a thickness equal to the difference in thickness between said walls and the edge portions thereof.

3. A fluid-tight end enclosure according to claim 2 wherein:
   (a) the edge portion joining the two walls together intermediate said opposite edge portions includes at least one opening therethrough for receiving the end portion of another conductor means in sealing fluid-tight relationship therewith with the end portions of the two conductor means adapted to be connected together internally of said flexible bag.

4. A fluid-tight end enclosure according to claim 3 wherein:
   (a) said walls are joined together internally of said bag about said openings by thickened portions thereof filling the space between the walls; and
   (b) said openings extend through said thickened portions into the interior of said bag.

5. A connector assembly according to claim 4 further comprising:
   (a) a rigid support member connected to and extending through the thickened portions of the wall of said bag at a location spaced from the openings through which the second-mentioned conductor means extend; and
   (b) rigid bracket means releasably connected to said support member for holding a tubular housing with one end thereof in communication with the openings in said bag and into which the portion of said second-mentioned conductor means extending outwardly of said bag through said openings is insertable.

6. A fluid-tight end enclosure according to claim 4 wherein said means for tightly closing the open end of said bag in curved configuration includes:
 (a) a flexible metal shield superimposed over one wall of said bag;
 (b) means for connecting said metal shield in said one wall of said bag at its thickened portion; and
 (c) clamp means adapted to extend across said metal shield in overlying relationship with said shield and the open end of said bag for connection to a support member underlying said bag.

7. A fluid-tight end enclosure according to claim 6 wherein the means for connecting said metal shield to the bag in superimposed relationship over said one wall includes:
 (a) a rigid support member connected to said metal shield and extending perpendicularly through the thickened wall portions of said bag at a location spaced from the openings through which the second-mentioned conductor means extends and having an enlarged head on the end thereof facing the outer surface of the other wall for holding said bag against axial movement along said support member.

8. A fluid-tight end enclosure according to claim 7 further including:
 (a) rigid bracket means connected to said support member for holding a tubular housing with one end thereof in communication with the openings in said bag and into which the portion of the second-mentioned conductor means extending outwardly of said bag through said openings is insertable.

9. A connector-enclosure assembly for a strip-shaped conductor means comprising:
 (a) a flexible bag having:
  (1) two opposite walls joined together about their edge portions to form an open end between two opposite edge portions thereof for receiving the end portion of said strip-shaped conductor;
  (2) at least one opening extending into the interior of said bag at a location spaced from the open end thereof, the walls of said bag being joined together about said openings inwardly of said edge portions;
 (b) conductor means extending through said openings in fluid-tight relationship with the wall surface thereof and having an end portion located within said bag;
 (c) connector means fixed to the end portion of the conductor means extending through said openings and adapted to be secured to the end portion of the conductor means extending into the bag through the open end thereof;
 (d) a rigid support member connected to said bag at the portions of the wall which are joined together and at a location spaced from the openings extending through said joined portions;
 (e) rigid bracket means for holding a tubular housing with one end thereof in communication with the openings in said bag and into which the portions of said conductor means extending outwardly of said bag through said openings are insertable;
 (f) means for connecting said bracket means to said support member; and
 (g) means for tightly closing the open end of said bag with the end portion of said strip-shaped conductor means disposed internally thereof and connected to said connector means.

10. A connector-enclosure assembly according to claim 9 wherein:
 (a) the opposite edge portions of said bag each have a predetermined length;
 (b) a slit extends along each of said opposite edge portions from the open end of said bag, said slits having a length less than said predetermined length; and
 (c) said means for tightly closing the open end of the bag includes means for holding said bag in an arcuate orientation about an axis extending perpendicular to said open end and parallel to the walls thereof.

11. A connector-enclosure assembly according to claim 9 wherein:
 (a) said rigid support member extends through the walls of said bag in a direction perpendicular thereto and includes a hole extending therethrough; and
 (b) the means for connecting said bracket means to said support member includes a fastening member extending through the hole in said support member and a portion of said bracket means and bolted thereto.

12. A connector-enclosure assembly according to claim 11 wherein said bracket means comprises:
 (a) a first portion superimposed over said support member and extending in a direction away from said bag;
 (b) a second portion spaced from said bag and having an opening therein into which said tubular housing is adapted to be connected; and
 (c) a third portion spaced from said bag at a distance below said first portion as measured perpendicularly of said bag, said distance being equal to the height of said support member to provide the bracket with a lower open front.

13. A connector-enclosure assembly according to claim 12 wherein:
 (a) said bracket means is formed with:
  (1) a front wall facing toward said bag,
  (2) a top wall,
  (3) a rear wall, and
  (4) a bottom wall, connected together to define a box-like structure with open sides and an open lower front;
 (b) said first portion comprises a prong extending front said front wall;
 (c) said second portion is defined by one of said front, top and back walls; and
 (d) said third portion is defined by said bottom wall.

14. A connector-enclosure assembly according to claim 13 further including:
 (a) a U-shaped shield slidably connected to said bracket means in covering relationship with said front wall and the open sides thereof, said shield having an open front portion aligned with the lower open front of said bracket means.

References Cited
UNITED STATES PATENTS

| | | | |
|---|---|---|---|
| 2,617,011 | 11/1952 | MacKendrick | 219—528 |
| 2,795,685 | 6/1957 | Browne | 219—528 |
| 3,257,498 | 6/1966 | Kahn | 174—75 |
| 3,397,302 | 8/1968 | Hosford | 219—528 |

LARMIE E. ASKIN, *Primary Examiner.*

U.S. Cl. X.R.

174—75; 219—301, 535